M. R. KONDOLF.
BOX.
APPLICATION FILED AUG. 21, 1916.

1,284,908.

Patented Nov. 12, 1918.
9 SHEETS—SHEET 1.

Witness
Eric Ischinger
Edna K. Booth

Inventor
Mathias R. Kondolf
By Frank Keiper
Attorney

M. R. KONDOLF.
BOX.
APPLICATION FILED AUG. 21, 1916.

1,284,908.

Patented Nov. 12, 1918.
9 SHEETS—SHEET 2.

WITNESSES:
Eric Ischinger
Edna K. Booth

INVENTOR
Mathias R. Kondolf
BY
Frank Keifer
ATTORNEY

M. R. KONDOLF.
BOX.
APPLICATION FILED AUG. 21, 1916.

1,284,908.

Patented Nov. 12, 1918.
9 SHEETS—SHEET 4.

WITNESSES:
Eric Ischinger
Edna K. Booth

INVENTOR
Mathias R. Kondolf
BY
Frank Keifer
ATTORNEY

M. R. KONDOLF.
BOX.
APPLICATION FILED AUG. 21, 1916.

1,284,908.

Patented Nov. 12, 1918.
9 SHEETS—SHEET 6.

Witness
Eric Ischinger
Edna K. Booth

Inventor
Matthias R. Kondolf
By Frank Keiper
Attorney

M. R. KONDOLF.
BOX.
APPLICATION FILED AUG. 21, 1916.

1,284,908.

Patented Nov. 12, 1918.
9 SHEETS—SHEET 7.

Witness
Eric Ischinger
Edna K. Booth

Inventor
Mathias R. Kondolf
By Frank Keifer
Attorney

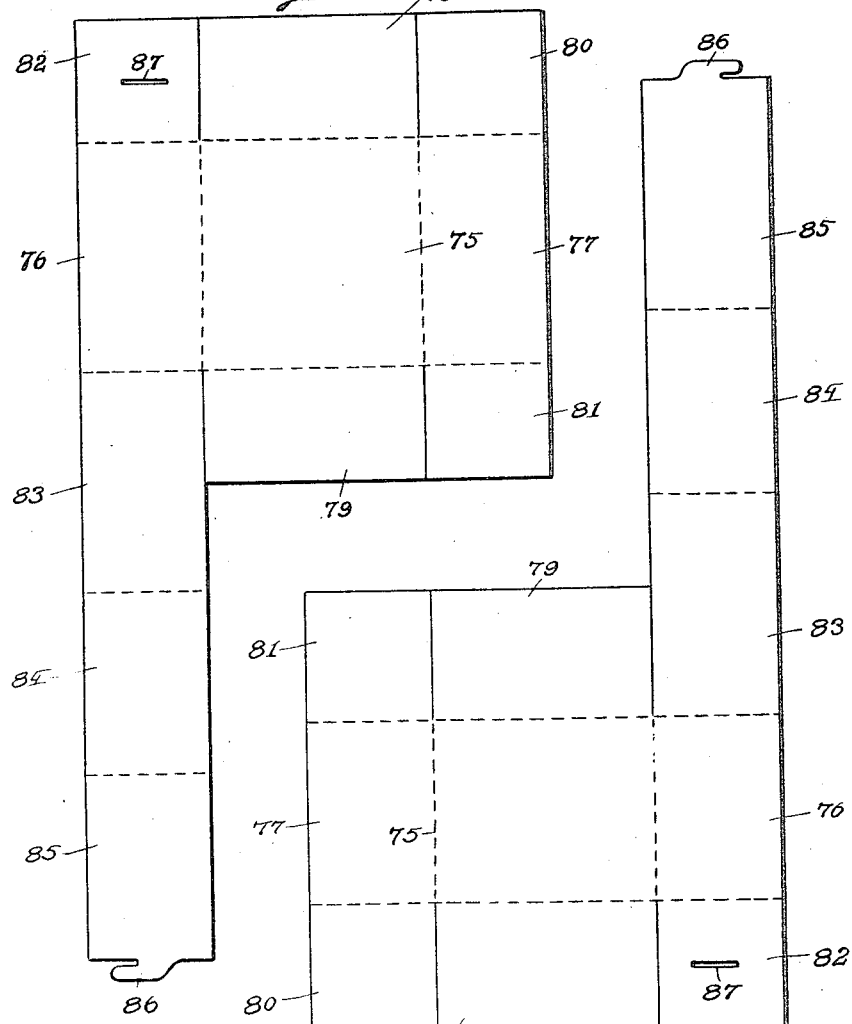

M. R. KONDOLF.
BOX.
APPLICATION FILED AUG. 21, 1916.

1,284,908.

Patented Nov. 12, 1918.
9 SHEETS—SHEET 9.

Witness
Eric Ischinger.
Edna K. Booth

Inventor
Mathias R. Kondolf
By Frank Kiefer
Attorney

UNITED STATES PATENT OFFICE.

MATHIAS R. KONDOLF, OF ROCHESTER, NEW YORK, ASSIGNOR TO FRANK N. KONDOLF, OF NEW YORK, N. Y.

BOX.

1,284,908.  Specification of Letters Patent.  Patented Nov. 12, 1918.

Continuation in part of application Serial No. 73,468, filed January 21, 1916. This application filed August 21, 1916. Serial No. 116,047.

*To all whom it may concern:*

Be it known that I, MATHIAS R. KONDOLF, a citizen of the United States, residing at Rochester, in the county of Monroe and State of New York, have invented certain new and useful Improvements in Boxes, of which the following is a specification.

The object of this invention is to provide a box made up of two or more consecutive sections placed one within the other.

Another object of the invention is to provide a process by which said box may be made.

These and other objects of the invention will be fully illustrated in the drawings, described in the specification and pointed out in the claims at the end thereof.

In the drawings,

Figs. 16, 17, 18 and 19 show different forms of blanks from which the locking strips are omitted, other forms of locking devices being used instead.

In the drawings like reference numerals indicate like parts.

Figure 1:
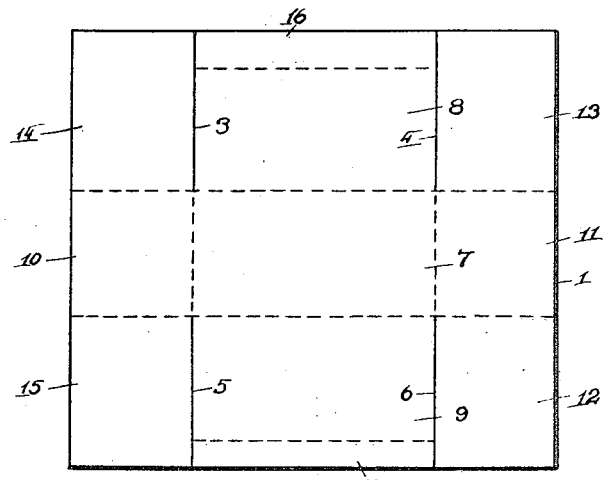
Figure 1 illustrates one of the blanks used for the making of a section of my improved box.
Figure 2:
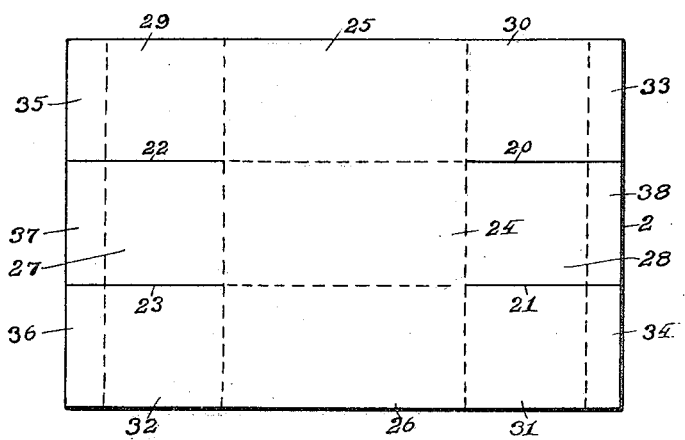
Fig. 2 illustrates another one of the blanks used for the making of another section of my improved box.
Figure 3:
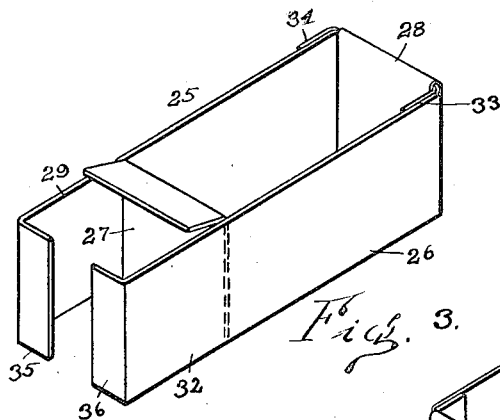
Fig. 3 is a perspective view showing the blank of Fig. 2 partly folded.

In the drawings reference numeral 1 indicates the blank shown in Fig. 1 and reference numeral 2 indicates the blank shown in Fig. 2. The blank shown in Fig. 1 is cut on the full lines 3, 4, 5 and 6 and is bent or folded on the dotted lines, on which lines it may or may not be scored. The part indicated by reference numeral 7 will form the bottom of the box. Reference numerals 8 and 9 indicate the sides of the box and 10 and 11 indicate the ends of the box. The sides and ends will first be bent up so as to stand at right angles to the bottom 7 after which the corner pieces 12, 13, 14 and 15 will be bent at right angles to the ends so as to lie parallel to each other and be embraced within the sides which would necessitate bending up the sides of the box last, after which the top edges or locking strips 16 and 17 of the sides 8 and 9 may be folded down over the corner pieces locking all the parts together. This will form the outer section of the box.

The blank 2, shown in Fig. 2, will be cut on the full lines 20, 21, 22 and 23 and will be folded on the dotted lines. In this blank, 24 will form the bottom of the box. 25 and 26 will form the sides of the box and 27 and 28 will form the ends of the box.

The sides 25 and 26 will first be bent up at right angles to the bottom 24 after which the ends 27 and 28 will also be bent up at right angles to the bottom of the box. The corner pieces 29, 30, 31 and 32, which are attached to the ends of the sides 25 and 26, will then be bent over the ends of the box, in which case the outer portions of the corner pieces 33, 34, 35 and 36, marked with dotted lines, will project beyond the ends and will be folded parallel to the side opposite to the one to which they are attached or if the box is of such a width they will merely fold against the ends. The upper margins or locking strips 37 and 38 of the ends 27 and 28 will be folded down over the over-lapping corner pieces, thus locking all the parts of the section together.

In the section of the box formed from the blank in Fig. 1, the locking strips 16 and 17 will project on the inside of the section and in the section of the box formed from the blank shown in Fig. 2, the locking strips 37 and 38 will project on the outside of the section. As the section formed from the blank in Fig. 2 will ordinarily be put inside of the section formed from the blank shown in Fig. 1, both sets of locking strips will be confined between the two sections by which they will be held securely in place. If the position of the sections is reversed, the locking strips in each case will be bent in the opposite direction and the other parts of the section will be folded to correspond so that in the finished box the locking strips will still be confined between the sections.

It will be understood that the members of the inner blanks must be slightly smaller than the corresponding members of the outer blanks so that the inner blanks can be nested in the outer blanks. This difference will be determined by the thickness of the stock used.

Figure 5:
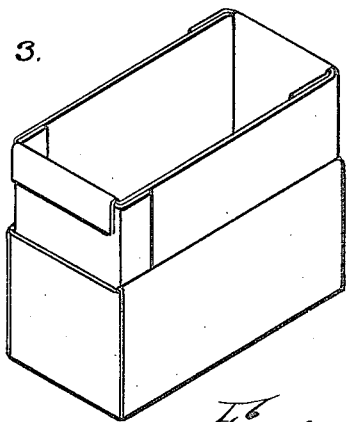
Fig. 5 is a perspective view showing the blank of Fig. 3 completely folded into a box section and partly inserted in the section formed by the folded blank shown in Fig. 4.
Figure 4:
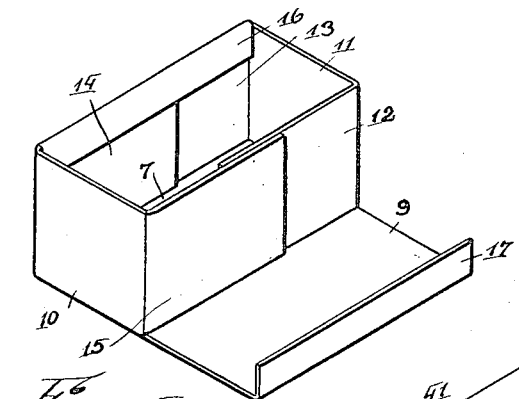
Fig. 4 is a perspective view showing the blank of Fig. 1 partly folded.
Figure 6:
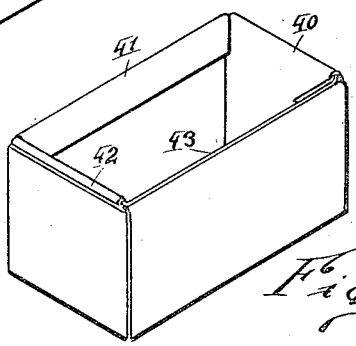
Fig. 6 is a perspective view of the completed box.

The box is finished by inserting the inner section of the box in the outer section and pushing it down therein, until the bottoms come together, Fig. 5 showing the two sections partly joined and Fig. 6 showing the two sections fully joined. Other methods of assembling the sections will be described hereinafter.

The blanks from which the sections are formed will preferably be coated on one side with an adhesive coating so that the coating will be on the members that are adjacent when the sections are folded and brought together.

I have described two sections joined together making a complete box, although it is obvious that any greater number of sections might in like manner be made and joined together in a single box.

Figure 16:
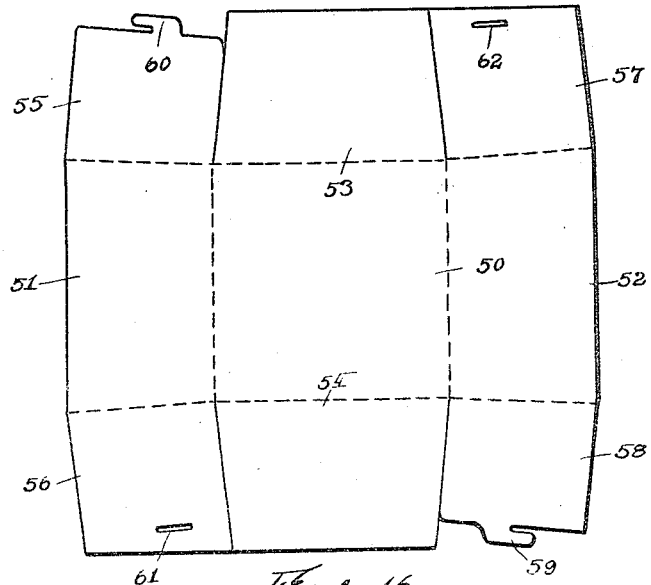

If it is desired to give the box a turned edge, the locking strips, instead of being folded so as to be held between the two boxes, will be left in such position that after the sections are brought together the locking strips on the inner section can be folded over and left projecting outside of the outer section and the locking strips on the outer section can be folded over and left projecting inside of the inner section. To do this the sections must be inserted in such a manner so that one set of locking strips are intermediate the other set in the finished box. In this style box the locking strips should be fastened by adhesive or otherwise, and additional locking hooks on the corner pieces, as shown in Fig. 16, should preferably be used.

As shown in Fig. 6 the locking strips are turned as shown at 40 and 41 and left exposed to form a turned edge and conceal the layers of the sections, while at 42 and 43 the locking strips are folded and concealed between the sections so as to leave the edges or layers of the sections exposed.

After the box has been assembled, as above described the sides are forced together by hand or a male and female die or by air pressure, using the apparatus and the process described in my application No. 67,890, filed December 20, 1915 and 77,265 filed February 9, 1916, both of which are copending, in which case the dies would be formed to correspond with the box and the air pressure could be applied either to the outside or the inside of the box.

Figure 7:
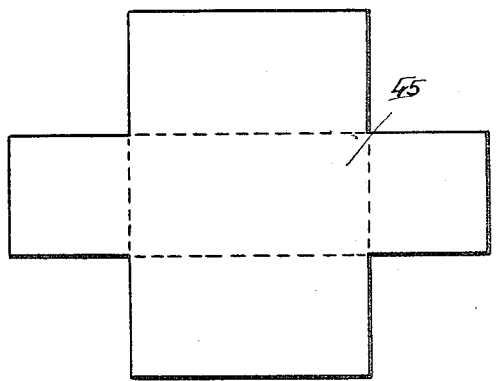
Fig. 7 is a plan view of the reinforcing blank.
Figure 8:
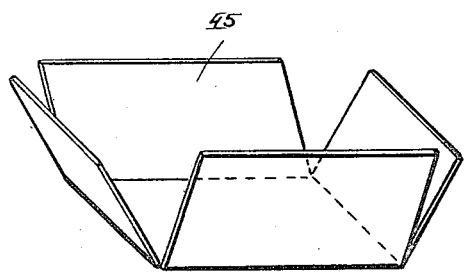
Fig. 8 is a perspective view of the reinforcing blank partly folded.
Figure 9:
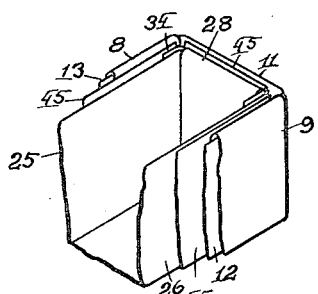
Fig. 9 is a perspective view of the finished box partly broken away showing the inner and outer sections and the section formed from the reinforcing blank between them.

It will also be understood that a box made in accordance with the above can be readily reinforced and in Fig. 7 I have shown a blank 45 which may be used for the purpose of reinforcing the box. The blank shown is provided with a bottom member and side and end members integral therewith. The side and end members will be bent up as is illustrated in Fig. 8 and the reinforcing section will be inserted in the outer section before the inner section is inserted therein or may be placed over the inner section and inserted with it in the outer section. If desired the reinforcing may be limited merely to the sides or ends or bottom in which case the reinforcing blanks would be cut to correspond and inserted as above described.

Boxes made in sections and then put together as described herein are particularly adapted to have heavy and bulky reinforcements placed between the sections, and it is entirely feasible and practicable to use such material as rotary cut veneer wood in its usual warped and curled condition for this purpose without affecting the shape of the box.

In this manner extra bottom, side and end members as well as metal straps or devices used to fasten the box covers can be included between the layers and become a part of the box.

Figure 10:
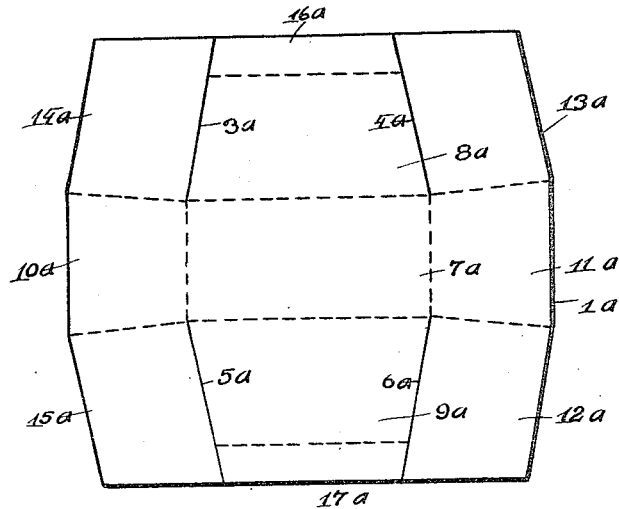
Figs. 10, 11, 12, 13, 14 and 15 show different forms of blanks by which sections for boxes of this same type may be made.
Figure 12:
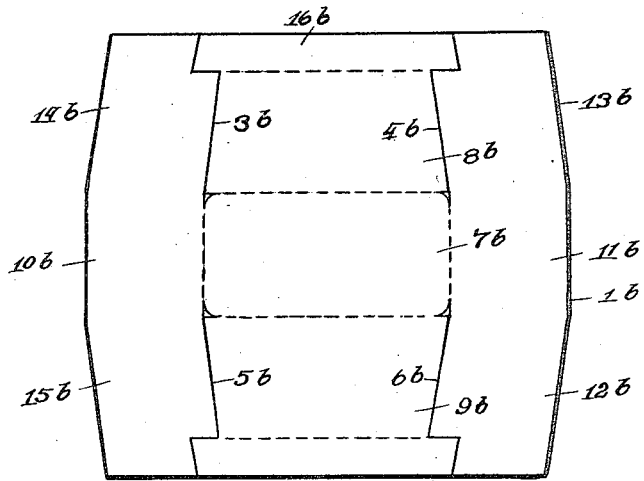
Figure 14:
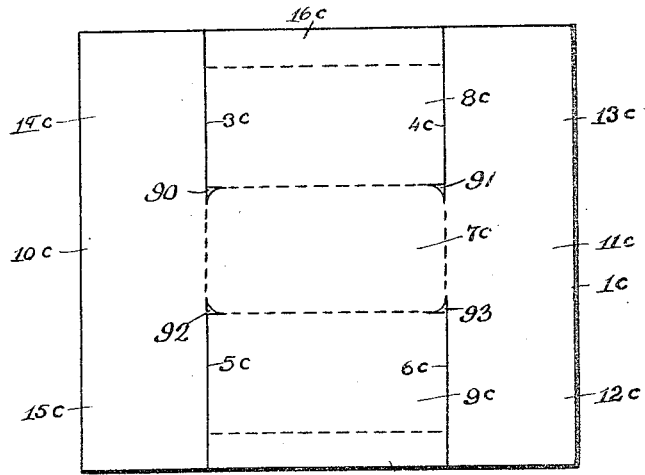

In describing Figs. 10, 12 and 14 like parts have been indicated by the same reference characters that have been used in describing the corresponding parts in Fig. 1 the reference character $a$ being added to the characters in Fig. 10 reference character $b$ to the characters in Fig. 12 and reference character $c$ to the characters in Fig. 14.

Figure 11:
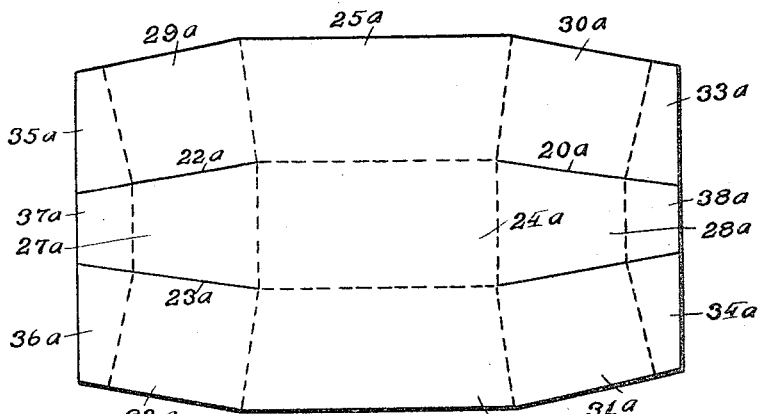
Figure 13:
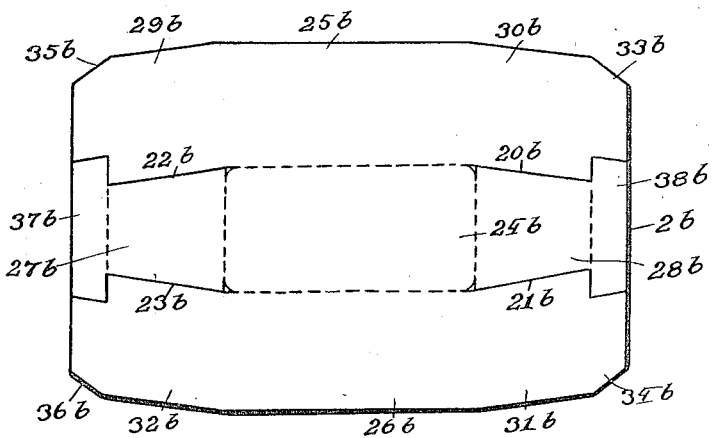
Figure 15:
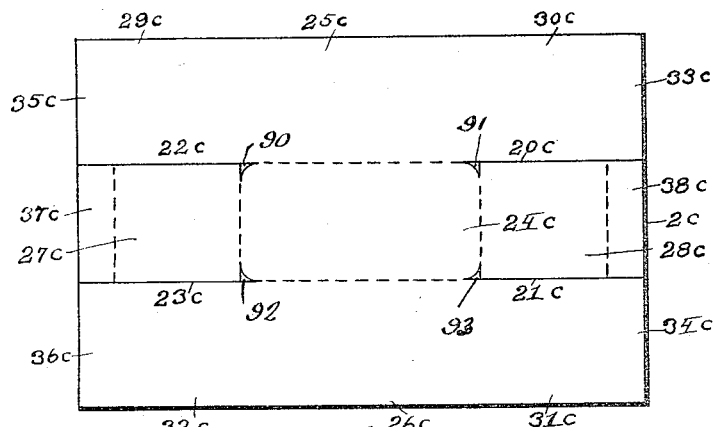

In describing Figs. 11, 13 and 15 like parts have been indicated by the same reference characters that have been used in describing the corresponding parts in Fig. 2 the reference character $a$ being added to characters in Fig. 11 reference character $b$ to the character in Fig. 13 and reference character *c* to the characters in Fig. 15.

In Figs. 10 and 11 I have illustrated blanks for a similar outer and inner section, the blanks being cut along the solid lines and folded along the dotted lines.

It will be understood that the box folded from the blanks shown in Figs. 1 and 2 will be rectangular with all corners square, while the box formed from the blanks shown in Figs. 10 and 11 will have the ends and sides tapered or out of parallel with each other and connected by angular corners with the bottom of the box and the opening at the top of the box rectangular in outline.

The blanks, shown in Figs. 12 and 13 will form a box in which the ends and sides are tapered and are connected by round corners. The box formed from the blanks, shown in Figs. 14 and 15 will have parallel sides and ends connected by round corners and in this box the opening at the top of the box will be of substantially the same dimensions as the bottom of the box. In these boxes, the locking strips are disposed on the blanks with the two sections so that they will come in the one blank at the ends of the box and in the other blank at the sides of the box and the locking strips can be turned into the space between the sections or can be turned over the edges of the box to form a turned edge.

In cases where blanks similar to any one of the blanks shown in Figs. 1 to 15 are used, the locking strips of both sections may be folded to lie in the space between the two sections or one set of them may be folded so as to lie between the sections and the other locking strips may be folded over the other section to make a turned edge.

In the box formed from the blanks shown in Figs. 12, 13, 14 and 15, the bottom members will be cut with square corners, which square corners 90, 91, 92 and 93 can be turned up and held between the sections to seal and strengthen the lower corners of the box.

It will be noted that in each blank shown in Figs. 1 to 15 the end and the side members are arranged in pairs and are formed integral with the bottom and that members of one pair will always be wider than the members of the other pair, the excess of stock being used to form the locking strips and that in each box the locking strips will be on the sides in the one section and on the ends in the other section. It will also be noted that these locking strips will be integral with one pair of members and lapping or corner pieces will be integral with the other pair of members which lapping pieces will connect the adjacent sides and ends and will in turn be held in place by the locking strips.

It will be understood that the locking strips or pieces may be of any width and may be folded to form pockets around the top of the box to receive the flanges of the cover or to reinforce the box as is more particularly described in my co-pending application Serial No. 80,876, filed February 28, 1916. The corner pieces may be lengthened to match the width of the side and end members in each blank and the extra stock may be used to reinforce the box.

In Figs. 16, 17, 18 and 19 I have shown blanks with other forms of locking devices.

Figure 17:
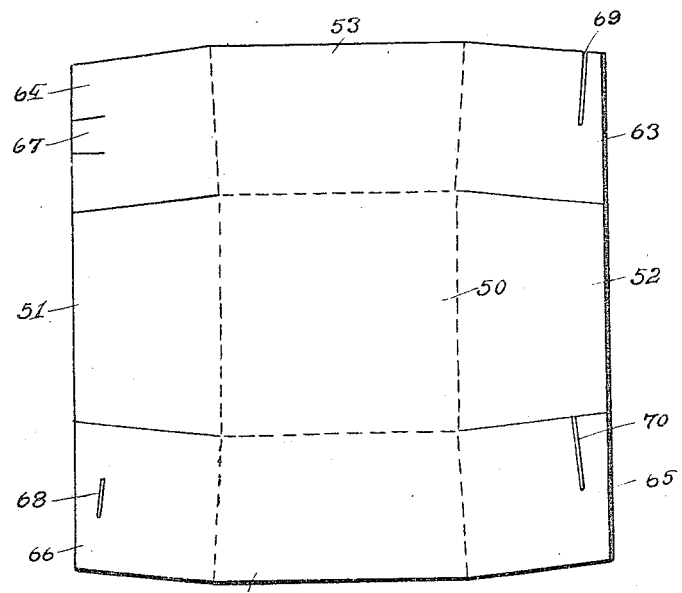

In Figs. 16 and 17, 50 indicates the bottom members to which are attached the side members 51 and 52 and the end members 53 and 54. In Fig. 16 are provided the corner pieces 55 and 56 which are carried on the side member 51 and the corner pieces 57 and 58 which are carried on the side member 52. The corner pieces 55 and 58 have hooked shaped ends 59 and 60. The hooked end 59 is intended to engage with the slot 61 and the hooked end 60 is intended to engage with the slot 62 when the blank is folded into the section.

In Fig. 17 the corner pieces 63 and 64 are attached to the end member 53 and the corner pieces 65 and 66 are attached to the end member 54. The corner piece 64 is slotted to form a tongue 67 that engages with the slot 68 when the blank is folded into sections and the corner pieces 63 and 65 are slit at 69 and 70 so as to engage and interlock with each other when the blank is formed into the section.

It will also be understood that any one of the types of locking devices shown in any of the figures may be used in any of the sections or any combination of these locking devices may be used in the various sections.

In Figs. 18 and 19 I have shown another form of blank of which two blanks may be cut from a single rectangular sheet with practically no waste of stock, although it may be desirable to form blanks of this sort of such dimensions as to make it impractical to cut both of them from a single rectangular sheet without waste. In these figures 75 indicates the bottom member to which are attached side members 76 and 77 and the end members 78 and 79. Connected to the side member 77 are the corner pieces 80 and 81 and connected to the side member 76 is the corner piece 82 and the corner piece 83. It will be seen that the corner pieces 80, 81 and 82 conform to the width of the side and end members, while the corner piece 83 is extended and has attached thereto the additional pieces 84 and 85, the piece 83 being adapted to lap the end member 79 and the piece 84 being intended to lap the side member 77 and the piece 85 being intended to lap the end member 78. The corner piece 81 will also lap the end member 79 and the corner pieces 80 and 82 will lap the end members 78. The piece 85 is provided with a hook 86 and the corner piece 82 is slotted at 87, the hook 86 being intended to engage with the slot 87 when the section has been formed as above described.

The parts 76, 83, 84, 85 and 82 will be held in cell form by the engagement of the hook 86 with the slot 87 and the other wall members of the blank will be placed inside of the cell of the section that is intended to be used on the outside of the box and will be placed on the outside of the cell of the section that is to be used on the inside of the box.

Figure 20:
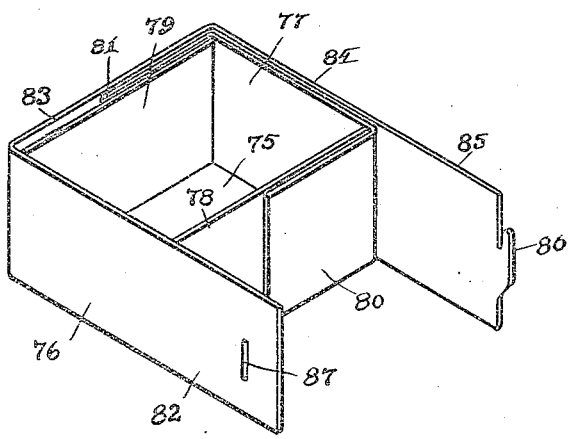
Figs. 20 and 21 show the blanks of Figs. 18 and 19 folded up into sections.
Figure 21:
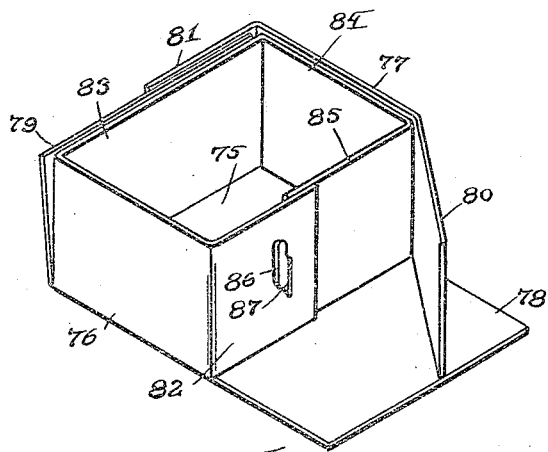

In Fig. 20 I have shown one of these blanks folded to form the outer section of the box and in Fig. 21 I have shown one of these blanks folded to form the inner section of the box. By putting the section shown in Fig. 21 inside of the section shown in Fig. 20, the loose parts of each will be held by the other or between the two sections.

It will be understood that in using the blanks shown in Figs. 16 and 17 the corner pieces may be fastened together by any means other than what are shown or by the use of an adhesive and the side and end members will be bent up from the blank to form the section therefrom.

In case the box made from blanks similar to those shown in Figs. 16 and 17 is to be of such a height that the corner pieces normally will be less than the desired length, the side or end members or both may be widened out and the corner pieces may be extended to correspond in the making of the blank. In such case the side or end members or both will have excess width of stock similar to some of the members in the blanks shown in Figs. 1 to 15. In the finished section the excess width of these members will be folded over the corner pieces to form locking strips as is described in connection with Figs. 1 to 15.

In all cases the corner pieces may also be fastened together by any suitable means in addition to the locking strips provided they are of sufficient length to lap each other.

If desired two or more blanks of the same kind as for example such as are shown in Fig. 1 may be used in the making of a box. When similar blanks of the kind shown in Figs. 1 to 17 inclusive are used in the same box, the locking devices or fastening means of all blanks or sections will come together on two sides of the box instead of the locking devices or fastening means of one section being located on sides that are intermediate the sides on which the locking devices or fastening means of the other section are located.

It will be understood that in the making of my improved box, each outer and each inner blank is provided with locking means operative or complete in each blank. For example, in the blanks shown in Figs. 1 and 2 the flaps or strips 16, 17, 37 and 38 comprise the locking means therefor and in the blank shown in Fig. 16 the hooks 59 and 60 in conjunction with the slots 61 and 62 comprise the locking means for this blank. When the blanks are folded, these locking means operate to hold or lock part of the members of the section in position; thus, each locking strip of the blanks shown in Figs. 1 and 2 overlaps the wall member to which it is attached and holds two corner pieces in place—the corner pieces in turn holding the wall members to which they are attached. The locking strips or flaps themselves are not, however, entirely held against movement in all directions and are regarded as loose members in the description of the sections made from these blanks. In the blank as shown in Fig. 16, the hooks engage their respective slots and thus lock or hold the corner pieces directly and the corner pieces in turn hold in place the wall members to which they are attached. The remaining wall members of each section are not entirely held against movement in all directions and so are regarded as loose members in the description of the sections made from this blank.

The blanks are so folded that in each section the so-called loose members of the outer section are free to move inwardly and the so-called loose members of the inner section are free to move outwardly. When the sections are brought together or assembled with the bottom members superimposed, it is evident that the loose members of each section will be held in place between the locked members of their own section and the members of the next adjacent section and in the finished box all of the members will be held.

In the case where an adhesive is used between the layers of the box, it is most important that the parts be held in position during the pressing operation and during the time required to set the adhesive in order to obtain a good quality of boxes. After the adhesive has set the members of the box are also held in place by the adhesive as well as by the locking means and method of assembling the sections as above described.

This is possibly the most important feature of my invention.

This result may be secured by sections formed of any kind of blanks having any kind of locking devices.

It will also be understood that the inner sections may be folded and placed on the blank of the outer sections which may then be folded around it. Such a method of procedure, while less desirable, is still regarded as equivalent to or within the scope of my invention.

It will be also understood that boxes of this sort may be made of any size, dimension or shape.

It will also be understood that in the blanks herein described there will be little or no waste material and that the internal stripping operation or the removal of waste material from the inner part of the blank is eliminated, the stripping being confined where necessary, entirely to the outer edges of the blank and consequently the blanks can be readily formed from roll stock.

It is evident that the box as made from the blanks as shown in Figs. 1 to 15 and by the method as described above is particularly adapted to be manufactured by automatic machinery, since there is no internal stripping to form finished blanks and no hooking of members involved in the folding operation.

It will be understood that the boxes formed from the blanks as described herein are "open" boxes in the sense that they are without integral covers and require a separate lid or cover if the same is desired.

It will be understood that this application is in part a continuation of my prior application No. 73,468, filed January 21, 1916.

I claim:

1. An open box comprising a plurality of separate box sections, each of said sections comprising members to form end and side walls and a bottom, each of said sections having complete locking means adapted to hold part of its members in box form, said sections being assembled one within another so the bottom members superimpose and the loose members of each section are held in place between the locked members of their own section and the members of the next adjacent section.

2. An open box comprising a plurality of separate box sections, each of said sections comprising members to form end and side walls and a bottom, each of said sections having complete locking means adapted to hold part of its members in box form, said sections being assembled one within another so the bottom members superimpose and the loose members of each section are held in place between the locked members of their own section and the members of the next adjacent section, and means for fastening said sections together.

3. An open box comprising a plurality of separate box sections, each of said sections comprising members to form end and side walls and a bottom, each of said sections having complete locking means adapted to hold part of its members in box form, said sections being assembled one within another, so the bottom members superimpose and the loose members of each section are held in place between the locked members of their own section and the members of the next adjacent section, and reinforcement placed between said sections and held in place thereby.

4. An open box comprising a plurality of separate box sections, each of said sections comprising members to form end and side walls and a bottom, each of said sections having complete locking means adapted to hold part of its members in box form, said sections being assembled one within another so the bottom members superimpose and the loose members of each section are held in place between the locked members of their own section and the members of the next adjacent section, with adhesive between the layers of the box and the layers of the combined sections being pressed closely together to finish the box.

5. An open box comprising a plurality of separate box sections, each of said sections comprising members to form end and side walls and a bottom, each of said sections having complete locking means adapted to hold part of its members in box form, said sections being assembled one within another so the bottom members superimpose and the loose members of each section are held in place between the locked members of their own section and the members of the next adjacent section, and corner portions of one or more bottom members adapted to be turned up and held between the sections to seal and strengthen the lower corners of the box.

6. An open box comprising a plurality of separate box sections, each of said sections comprising members to form end and side walls and a bottom, each of said sections having complete locking means adapted to hold part of its members in box form, said sections being assembled one within another so the locking means of one section are at right angles to the locking means of the next adjacent section with the bottom members superimposed, the loose members of each section being held in place between the locked members of their own section and the members of the next adjacent section.

7. An open box comprising a plurality of separate box sections, each of said sections comprising members to form end and side walls and a bottom, each of said sections having complete locking means adapted to hold part of its members in box form, said sections being assembled one within another so the locking means of one section are at right angles to the locking means of the next adjacent section with the bottom members superimposed, the loose members of each section being held in place between the locked members of their own section and the members of the next adjacent section, and means for fastening said sections together.

8. An open box comprising a plurality of separate box sections, each of said sections comprising members to form end and side walls and a bottom, each of said sections having complete locking means adapted to hold part of its members in box form, said sections being assembled one within another so the locking means of one section are at right angles to the locking means of the next adjacent section with the bottom members superimposed, the loose members of each section being held in place between the locked members of their own section and the members of the next adjacent section, and reinforcement placed between said sections and held in place thereby.

9. An open box comprising a plurality of separate box sections, each of said sections comprising members to form end and side walls and a bottom, each of said sections having complete locking means adapted to hold part of its members in box form, said sections being assembled one within another so the locking means of one section are at right angles to the locking means of the next adjacent section with the bottom members superimposed, the loose members of each section being held in place between the locked members of their own section and the members of the next adjacent section, with adhesive between the layers of the box and the layers of the combined sections being pressed closely together to finish the box.

10. An open box comprising a plurality of separate box sections, each of said sections comprising members to form end and side walls and a bottom, each of said sections having complete locking means adapted to hold part of its members in box form, said sections being assembled one within another so the locking means of one section are at right angles to the locking means of the next adjacent section with the bottom members superimposed, the loose members of each section being held in place between the locked members of their own section and the members of the next adjacent section, and corner portions of one or more bottom members adapted to be turned up and held between the sections to seal and strengthen the lower corners of the box.

11. The combination in an open box of a plurality of separate box sections, each of said sections comprising members to form end and side walls and a bottom member, each of said sections having complete locking means adapted to hold its members in box form, said sections being assembled one within another so that the locking means of one section are at right angles to the locking means of the next adjacent section and the bottom members of the several sections superimposed, said side and end members being folded up around the bottom member.

12. An open box comprising a plurality of sections, each of which sections is formed from a separate blank, a bottom member included in each of said blanks, said blanks being each cut at four places from the margin thereof to the corners of the bottom member, forming side members and end members integral with said bottom members, with the corner pieces of said blanks left integral with one set of said members, and locking strips left integral with the other set of said members, said blanks being separately folded into box sections with the corner pieces of each blank lapping the members bearing the locking strips and being fastened in place by said locking strips, said sections being assembled one within another so that the locking strips of one section are at right angles to the locking strips of the next adjacent section, and the bottom members of the several sections superimpose, the locking strips of each blank being held between adjacent sections, said sections and their layers being pressed closely together to form a finished box.

13. An open box comprising two series of members to form a plurality of layers in the walls and bottom of the box, each series of members having complete locking means adapted to lock part of the members of each series in box form, the loose members of both series being held in place between said locked members when the bottom members are superimposed.

14. An open box comprising two series of members to form a plurality of layers in the walls and bottom of the box, each series of members having complete locking means adapted to lock part of the members of each series in box form, the loose members of both series being held in place between said locked members when the bottom members are superimposed, and adhesive between the layers of the box.

15. An open box comprising two series of members to form a plurality of layers in the walls and bottom of the box, each series of members having complete locking means adapted to lock part of the members of each series in box form, the loose members of both series being held in place between said locked members when the bottom members are superimposed, the locking means of one series of members being placed at right angles to the locking means of the other series of members.

16. An open box comprising two series of members to form a plurality of layers in the walls and bottom of the box, each series of members having complete locking means adapted to lock part of the members of each series in box form, the loose members of both series being held in place between said locked members when the bottom members are superimposed, the locking means of one series of members being placed at right angles to the locking means of the other series of members, and adhesive between the layers of the box.

17. A double box composed of two folded blanks assembled one within the other, the inner box section having loose members at two opposite sides and the outer box section having also loose members at two opposite sides but arranged transversely to the loose members of the inner box section; the construction being such that the loose members of the inner box section are held up by sides of the outer box section and the loose members of the outer box section are held up by sides of the inner box section.

In testimony whereof I affix my signature.

MATHIAS R. KONDOLF.

Copies of this patent may be obtained for five cents each, by addressing the "Commissioner of Patents, Washington, D. C."